Oct. 9, 1962 — C. M. MINKE — 3,057,190
MATERIALS TESTING
Filed Dec. 20, 1957 — 3 Sheets-Sheet 1

INVENTOR
*Charles M. Minke*

BY *Stevens, Davis, Miller & Mosher*
ATTORNEYS

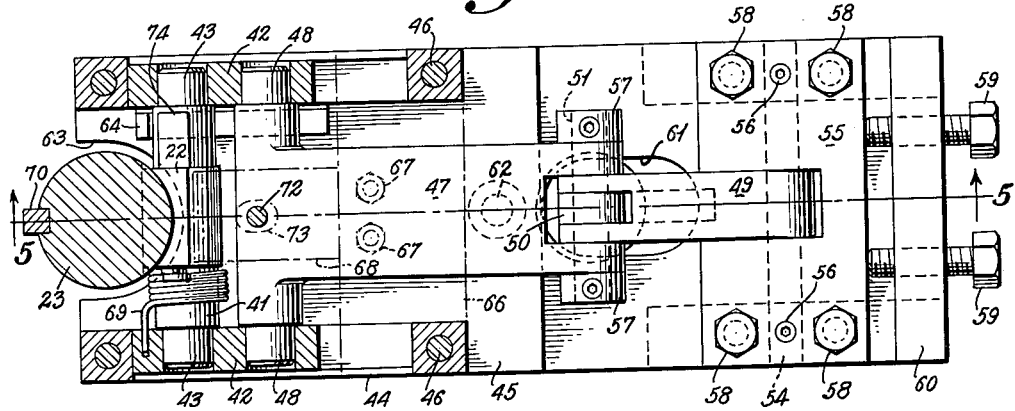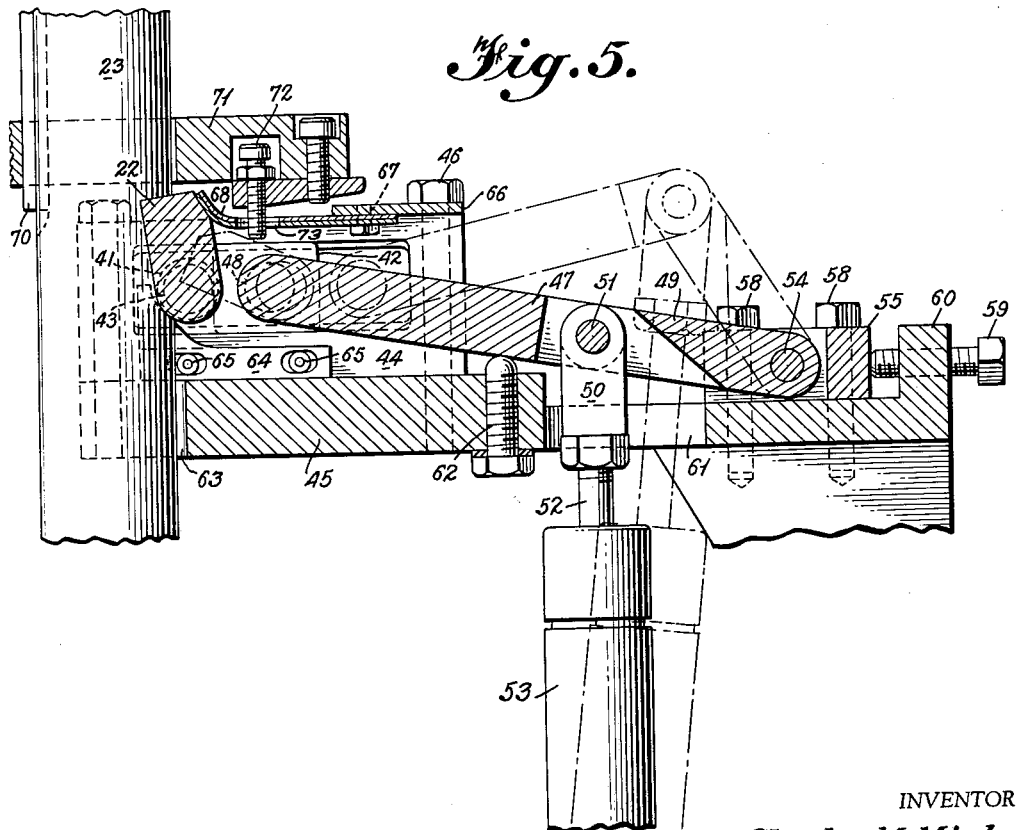

3,057,190
MATERIALS TESTING
Charles M. Minke, Cumberland, Md., assignor to Allegany Instrument Company, Inc., Cumberland, Md., a corporation of Maryland
Filed Dec. 20, 1957, Ser. No. 704,143
2 Claims. (Cl. 73—89)

This invention relates to an apparatus and method for testing the strength of materials at extremely high deformation rates.

For some time there has been a need for a tensile and compressive testing machine with higher rate performance than testing machine technology was able to produce, requiring investigators to use low rate and impact techniques. New materials, as well as new designs and manufacturing techniques, now demand truly comprehensive testing, testing at deformation rates comparable to those the product actually encounters in use. This need has led to the development of the present invention, which provides a completely calibrated stress-strain record of the deformation of a specimen at rates of deformation as high as 6000 inches per minute. The apparatus can be operated by non-skilled personnel and it permits thorough low cost investigation of ultimate yields, elastic moduli, temperature effect, etc.

Briefly, according to the invention, a pressure is built up in an accumulator behind a piston which is latched by a specially designed latching mechanism. This piston is attached to the tension or compression jaws which hold the specimen. When the latching mechanism disengages the piston, the force behind the piston will drive the piston very quickly giving a high strain rate to the specimen.

An object of the invention is to provide a new and improved apparatus for testing strength of materials.

A further object of this invention is to provide a new and improved testing apparatus for strength of materials testing at a high rate of deformation.

A further object of this invention is to provide an improved method of testing strength of materials at a high rate of deformation.

A further object of this invention is to provide a new and improved method of testing strength of materials.

A further object of this invention is to provide a new and improved testing apparatus which can be operated easily.

A further object of this invention is to provide a truly comprehensive testing of strength of materials.

A further object of this invention is to provide an apparatus and method for testing at deformation rates comparable to those the product actually encounters in use.

A further object of this invention is to provide an improved latch mechanism.

A further object of this invention is to provide an improved latch mechanism for the testing apparatus.

A further object of this invention is to provide a method of obtaining calibrated stress-strain records.

The objects and advantages can be better understood with reference to the specific description and following drawings.

FIGURES 4 and 5 illustrate the details of the mechanical latching mechanism for the apparatus.

Figure 1:
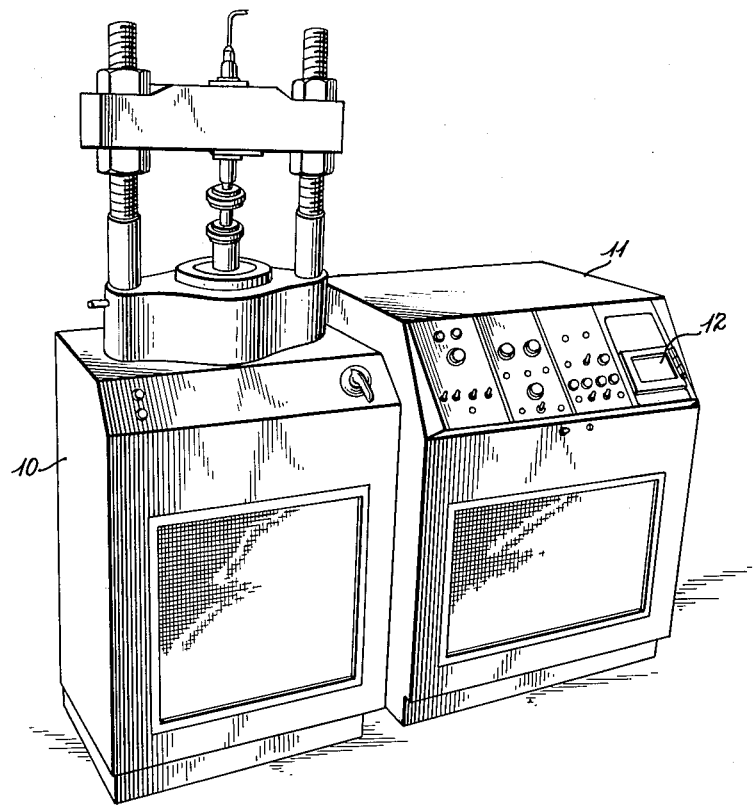
FIGURE 1 shows an external view of the testing apparatus.

In the external view shown in FIGURE 1 the reference number 10 indicates generally the stress applying mechanism and the reference number 11 indicates generally the recorder of the stress-strain phenomenon. The recorder produces the stress-strain record on the screen of the oscilloscope which is indicated by the reference number 12. During a test the trace produced on the oscilloscope 12 is photographed to get a permanent record of the stress-strain characteristics.

Figure 2:
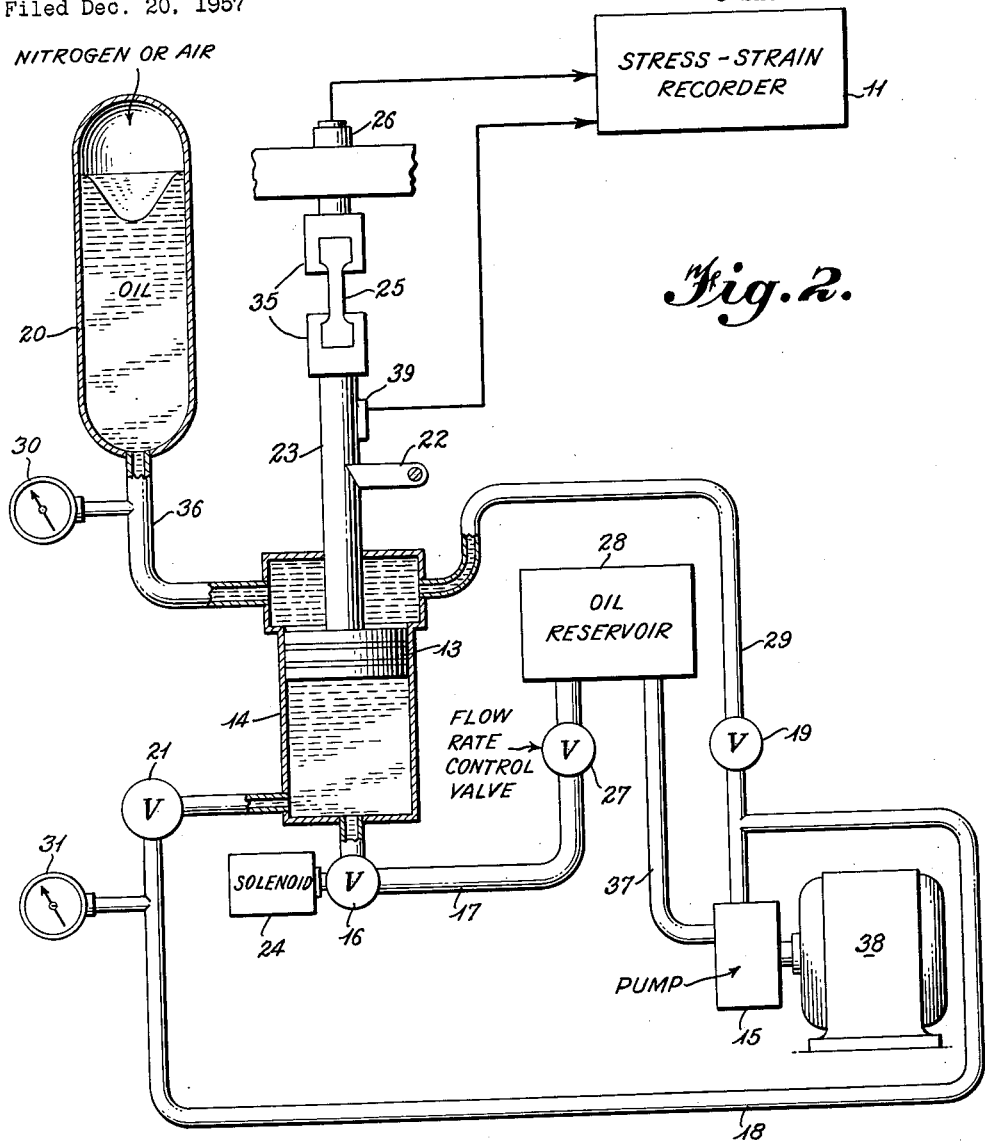
FIGURE 2 shows a schematic diagram of the apparatus illustrating the method of operation.
Figure 3:
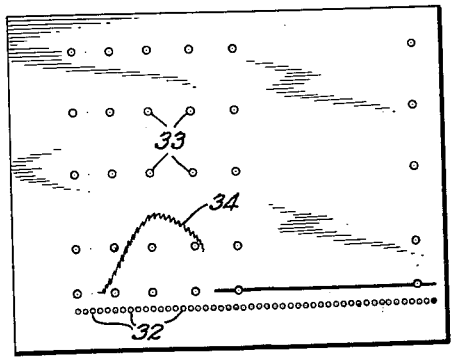
FIGURE 3 shows an example of the stress-strain record produced.

The operation of the mechanism is illustrated in detail by the schematic diagram shown in FIGURE 2. The apparatus can make tests either in tension or compression. FIGURE 3 illustrates a tension test. By simply changing the specimen holding jaws the device will be ready to make a compression test. A cylinder 14 is provided with a piston 13. A rod 23 connects the piston 13 to one of the tension jaws 35. A pipe 36 connects the cylinder above the piston 13 to a pressure accumulator 20. A gauge 30 indicates the pressure in the accumulator and above the piston 13. A pump 15 is connected to pump oil from a reservoir 28 to the cylinder 14 below the piston 13 through pipes 37 and 18. The pump 15 is driven by means of the electrical motor 38. The gauge 31 indicates the pressure in the pipe 18. A valve 21 is provided between the gauge 31 and the bottom of the cylinder 14. The bottom of the cylinder is connected to the oil reservoir by means of the pipe 17 through a valve 16 and a rate control orifice 27. The valve 16 is automatically controlled by a solenoid 24. The outlet side of the pump 15 is also connected to the cylinder 14 above the piston 13 by means of the pipe 29. A valve 19 controls the flow in pipe 29. A latch 22 is provided to secure the piston rod 23 and the piston 13 in their uppermost position. A transducer 26 produces a signal, the amplitude of which is substantially proportional to the force applied to the upper one of the tension compression jaws 35. The transducer 39 produces a signal, the amplitude of which is substantially proportional to the distance which the rod 23 moves. In the preferred embodiment the transducer 39 comprises a linear motion potentiometer fastened to the rod 23. The output signals from the transducers 26 and 39 are applied to the recorder 11.

At the start of the operation of the test cycle the piston 13 is in the bottom position. First, the operator opens the valve 19 and closes the valve 21. The motor 38 is then started by the operator, driving the pump 15. When the motor 38 starts, the solenoid 24 automatically closes the valve 16. The pump 15 then forces oil from the reservoir 28 into the accumulator 20 through the pipes 37, 29, and 36. The accumulator 20 contains a fixed amount of gas, which in the preferred embodiment is nitrogen, but it could be air or any other convenient gas. As oil in the accumulator increases the fixed amount of gas will be compressed thereby increasing the pressure in the accumulator. The operator allows the pump to run until the proper amount of pressure is obtained as indicated by the pressure gauge 30. When the proper pressure is indicated, the operator opens valve 21 and closes valve 19. The pump 15 will then force oil from the reservoir 28 into the cylinder 14 below the piston 13 through the pipes 37, and 18. This operation forces the piston 13 upwards until it reaches its uppermost position as is shown in the drawing. This upward movement of the piston 13 forces additional oil into the accumulator 20 through the pipe 36 from the cylinder 14 above the piston 13, thereby further increasing the pressure in the accumulator. The increase in pressure in the accumulator is transmitted through the pipe 36 to the top of the piston 13. At the top of the stroke of the piston the latch 22 engages the rod 23, the motor 38 is automatically stopped, thus stopping the pump 15, and the valve 16 is automatically opened by the solenoid 24. After the valve 16 is opened the pressure beneath the piston will be released and the pressure on top of the piston 13 will be pushing the piston downward against the latch 22. At this time the operator inserts the specimen 25 in the jaws 35. The operator will then trip the latch 22 and the piston 13 will be forced downward very quickly by the hydraulic pressure in the accumulator 20 thus applying a load very quickly to the specimen 25 in the jaws 35. When the piston 13 moves downward the oil in the cylinder below the piston will be forced into the reservoir through pipe 17. The rate of downward motion of the piston 13 and hence the strain rate of the specimen is determined by how fast oil flows out through the pipe 17. This rate of oil flow through the pipe 17 is controlled by the rate control orifice 27. Thus, the rate at which the specimen 25 is strained depends on this orifice 27. The orifice 27 is variable so that the strain rate may be controlled and various strain rates may be selected. During the test the output signal from the transducer 26, which is proportional to the force applied to the upper one of the jaws 35, will be proportional to the stress applied to the specimen 25. This output signal is applied to the stress-strain recorder and controls the vertical deflection of the oscilloscope. The transducer 39 produces an output signal which is proportional to the linear motion of the piston rod 23. This linear motion is equal to the strain of the specimen 25 and hence the output of the transducer 39 will be proportional to the strain. The output signal from this transducer is applied to the recorder 11 and controls the horizontal deflection of the oscilloscope.

Referring now to FIGURE 3 there is shown a typical stress-strain record made by the recorder 11. The output signal from the transducer 39 controls the horizontal deflection of the electron beam of the oscilloscope and the transducer 26 signal controls the vertical deflection of the electron beam. Thus, during the test this electron beam traces the curve such as is indicated by the number 34 which is a record of the stress-strain for the sample under test. The oscilloscope is provided with circuitry to generate the calibration marks 33 with the electron beam. The vertical rows of marks indicate the percentage of a predetermined value of stress applied to the specimen. The vertical columns indicate the strain of the specimen. The oscilloscope is also provided with an additional electron gun for applying a second electron beam on the screen of the scope. This second electron gun is used to generate the timing marks 32. These timing marks are generated by pulsing the second beam at constant time intervals and sweeping the beam horizontally with the strain signal from the transducer 39. The timing marks 32 will thus indicate the rate at which the strain is applied. A camera photographs the trace 34, as well as the calibration marks 33 and the timing marks 32.

In FIGURES 4 and 5, where the latch mechanism is illustrated in detail, the latch 22 is shown engaged with the rod 23. FIGURE 4 illustrates a top plan view, parts of which are shown in phantom. FIGURE 5 illustrates a section through FIGURE 4, and in phantom the position of the latch mechanism when it is disengaged. The latch 22 is fixed to a shaft 41 which is mounted between two slides 42 by bearings 43. The bearings 43 permit the shaft 41 to rotate and thus the latch 22 may pivot about the axis of the shaft 41. The slides 42 ride in guides 44 which are fixed to a mounting plate 45 by means of bolts 46. A link 47 is also pivotally mounted at one end between the slides 42 by means of bearings 48. The other end of the link 47 is forked and is pivotally attached to one end of a second link 49 and a clevis 50 by means of a shaft 51. The end of the link 49 which is pivotally mounted on shaft 51 is also forked and both tines of the forked end fit between the tines of the forked end of the link 47. The clevis 50 fits between the tines of the forked end of the link 49 to pivot on the shaft 51. A pair of collars 57 are fixed to each end of the shaft 51 locking the shaft in position through the links 47 and 49 and clevis 50. A shaft 52 passes through an oval aperture 61 in the mounting plate 45 and fixedly attaches the clevis 50 to the piston of an air cylinder 53. The slot between the tines of the forked end of the link 49 is cut back at an angle so that the lower part of the slot extends further into the link than the upper part, the root of the slot being slanted. The purpose of this slanted root is to allow room for the clevis 50 in the disengaged position as is shown in phantom in FIGURE 5. The link 49 is pivoted on a shaft 54 which is mounted in a clevis block 55. The shaft 54 is positioned in the slot of the clevis block, to which it is secured by means of set screws 56. The link 49 pivots on the axis of the shaft 54 within the slot of the clevis block. Bolts 58 fasten the clevis block to the mounting plate and bolts 59 pass through a toe 60 of the mounting plate and butt against the clevis block to firmly fix the horizontal position of the clevis block. The mounting plate 45 is in two thicknesses. The guides 44 are mounted on the thicker portion while the oval aperture 61, the clevis block 55 and the toe 60 are all positioned on the thinner part of the mounting plate. A bumper 62 is mounted in the thicker part of the mounting plate 45. The bumper has a rounded end upon which the link 47 rests when the latching mechanism is in its engaged position as shown in FIGURE 5. The thicker end of the plate 45 is formed with a semicircular recess 63, the arms of which extend around the rod 23. The slide guides extend out over these arms. Extending partly over one arm of the recess 63 is a cam 64. This cam is firmly fastened to one of the guides 44 by means of screws 65. A dog 74 extends out from the latch 22 over the cam surface of the cam 64 to engage therewith. Fixed to, and extending across the top of the guides 44, is a mounting plate 66. Screws 67 fasten a leaf spring 68 to the underside of this mounting plate between the guides 44. The spring 68 engages the latch 22 and presses it firmly against the rod 23 when the latching mechanism is in the engaged position as shown in the figures. The spring 68 and plate 66 are illustrated in FIGURE 5 and are shown only in phantom in FIGURE 4. A torsion spring 69 encircles the shaft and urges the latch 22 in the opposite direction. The leaf spring 68 exerts a stronger couple on the latch than the torsion spring 69 and holds the latch in the engaged position. The rod 23 has a key 70 which slides in the groove in a fixed guide plate 71 when the rod 23 moves up or down. Mounted in a recess beneath the guide plate 71 is a butting screw 72, which extends down through an aperture 73 in the middle of the leaf spring 68 to point between the slides just above the level of the bearings 43 and 48 in the slides 42. This butting screw will engage the latch when it is disengaged, as is shown in phantom in FIGURE 5, preventing the latch from being pressed against the leaf spring by the torque of the torsion spring 69. The guide plate 71 is only shown in FIGURE 5.

When the latch 22 is in its engaged position and the rod 23 presses down against the face of this latch, the links 47 and 49 form a rigid arm. This is done by positioning the shaft 51 on the dead pivot center between the two links so that the line of force transmitted by each of the shafts is colinear. The bumper 62, on which the link 47 rests, maintains this dead center position, and the vertical level of the bumper 62 can be adjusted so that this exact position of the links 47 and 49 can be achieved. To disengage the latch mechanism the air cylinder 53 kicks the clevis 50 upward breaking the rigid arm formed by the links 47 and 49. This operation unlocks the latching mechanism and permits the downward force of the rod 23 on the nearly horizontal face of the latch to force the slides 42 to move in the slide guides 44. As the slides move the latch 22 pivots and moves out of engagement with the rod 23. The release movement of the mechanism is so fast that the inertia of the latch 22 will cause it to pivot counter-clockwise against the force of the torsion spring 69 until the dog 74 engages the cam 64. As the disengaging operation is carried out the air cylinder tilts as illustrated in phantom in FIGURE 5. The disengaged position of the latching mechanism is shown in phantom in FIGURE 5. In this position the torsion spring 69 presses latch 22 against the butting screw 72. After a test is completed, and the rod 23 is returned to the top of its stroke for another test, the latch mechanism is returned to its engaged position by the downward movement of the piston in the air cylinder. This action will cause the slides 42 to move to the left. As the slides 42 move to the left the torsion spring 69, and the leaf spring 68 guide the pivoting movement of the latch 22 and the leaf spring 68 provides final positioning of the latch against the rod 23. The position of the shaft 54 on which the link 49 pivots can be adjusted horizontally by varying the protuberance of the bolts 59 which butt against the clevis block 55, in which the shaft 54 is mounted. Thus, the shaft 54 can be exactly located in the position which produces the optimum operating conditions.

This latch mechanism accomplishes the necessary function of releasing the load swiftly and smoothly so that the stress is applied to the specimen with a minimum amount of oscillation.

The invention as described is a specific embodiment and can be modified within the spirit and scope of the invention, which is to be limited only as defined in the appended claims.

What is claimed is:
1. An apparatus for testing strength of materials comprising; a cylinder, a piston in said cylinder, a tank containing liquid and a fixed amount of gas, means for increasing the amount of liquid in said tank to thereby increase the pressure in said tank, means to transmit the pressure in said tank to one side of said piston to produce a resultant force on said piston, rod means to apply the force on said piston to the specimen to be tested, latching means preventing movement of said piston by said resultant force and preventing the application of said resultant force to the specimen to be tested, said rod having a groove defined therein, said latching means having one end shaped to fit in said groove, and means to release said latching means.

2. An apparatus for testing strength of materials comprising; a pair of jaws for holding the specimen to be tested, means mounting one of said jaws on a fixed support, a hydraulic cylinder, a piston riding in said cylinder, a rod fixedly attaching the other of said jaws to said piston, a reservoir, means for pumping liquid from said reservoir to one end of said cylinder, an accumulator comprising a tank containing a fixed amount of gas, means permitting liquid flow from the other end of said cylinder to said accumulator, means for latching said rod in position when said piston is at said other end of said cylinder, means permitting oil flow from said one end of said cylinder to said reservoir, a valve in said last named means, means to automatically close said valve in response to the beginning operation of said pumping means, means for varying the rate of flow in said means permitting flow between said cylinder and said reservoir, means for producing a signal which is a function of the force applied to said one of said jaws, means for producing a signal which is a function of the distance said other of said jaws moves, means for recording said signals, and means for releasing said latching means.

References Cited in the file of this patent
UNITED STATES PATENTS

| | | |
|---|---|---|
| 2,362,589 | Simmons | Nov. 14, 1944 |
| 2,389,912 | Jacoel | Nov. 27, 1945 |
| 2,533,025 | Martin | Dec. 5, 1950 |
| 2,568,042 | Vltavsky | Sept. 18, 1951 |
| 2,576,433 | Wood | Nov. 27, 1951 |
| 2,610,504 | Nigh | Sept. 16, 1952 |
| 2,612,774 | Zener et al. | Oct. 7, 1952 |
| 2,659,232 | Lubahn | Nov. 17, 1953 |
| 2,741,930 | Montooth et al. | Apr. 17, 1956 |
| 2,756,590 | Clifford et al. | July 31, 1956 |
| 2,810,288 | Herron et al. | Oct. 27, 1957 |
| 2,854,859 | Batchelder | Oct. 7, 1958 |